Feb. 25, 1941. P. VIANZONE 2,233,039
ELECTRIC LIGHTING DEVICE FOR BICYCLES AND SIMILAR ROAD VEHICLES
Filed Nov. 6, 1939
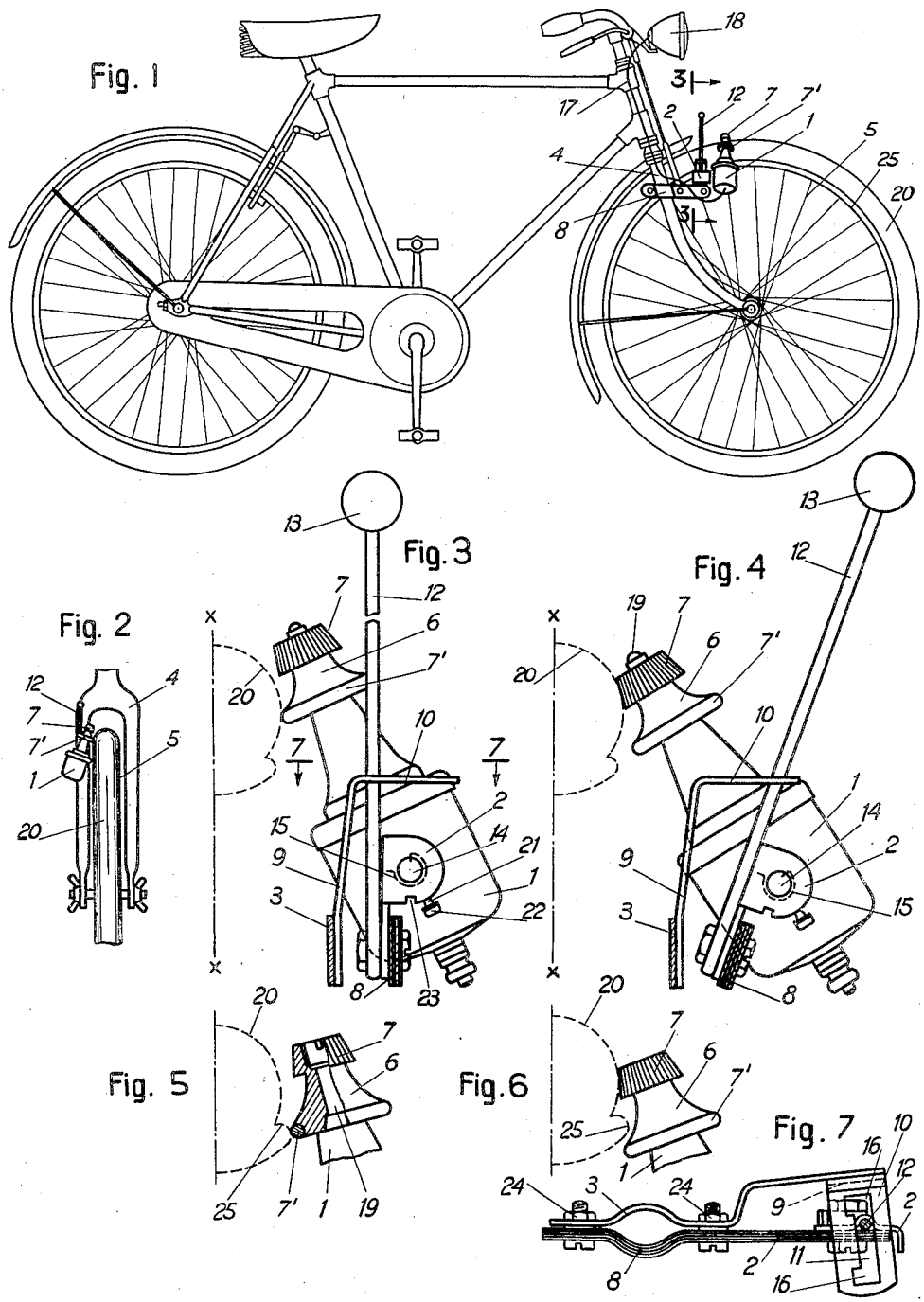
Inventor:
Pietro Vianzone Patented Feb. 25, 1941

2,233,039

UNITED STATES PATENT OFFICE 2,233,039

ELECTRIC LIGHTING DEVICE FOR BICYCLES AND SIMILAR ROAD VEHICLES

Pietro Vianzone, Turin, Italy

Application November 6, 1939, Serial No. 303,107
In Germany November 14, 1938

6 Claims. (Cl. 240—7.6)

This invention relates to lighting means for bicycles and the like which include an electric current generator arranged at one side of one of the bicycle wheels and having a driving shaft which is provided with a friction pulley adapted to be carried in engagement with the bicycle wheel tire for driving thereby.

This invention has for its object a device which provides for securing different drive ratios between the bicycle wheel and the generator shaft to obtain a satisfactory current generation in respect of extensively different speeds of the bicycle wheel.

In accordance with this invention, the generator driving friction pulley includes rims having different diameters, a support, on which the generator is pivotally mounted with the provision of means urging it towards the bicycle wheel tire, is in turn adjustably mounted at a side of the wheel, either arm of said friction pulley being caused to engage the bicycle wheel tire in accordance with the position imparted to said support and to the generator carried by it.

In an embodiment of this invention the generator support is flexibly mounted in such a manner that the axis of the pivotal mounting of said generator on said support may take positions at different distances with respect to the bicycle wheel tire and consequently the generator under the action of its urging means takes up different inclinations with respect to the bicycle wheel, different rims of the drive pulley thereof thus contacting with the wheel tire.

An embodiment of this invention is illustrated by way of example on the annexed drawing and Fig. 1 is a side view of a bicycle having a lighting device in accordance with this invention;

Fig. 2 is a fragmentary end view of Fig. 1 as seen from the right hand end in Fig. 1;

Fig. 3 shows to an enlarged scale the generator with cooperating parts in one of the positions in which it may be located for driving by the bicycle wheel tire under a given ratio, the view of Fig. 3 being substantially a section on line 3—3 of Fig. 1;

Fig. 4 is a view similar to Fig. 3 with said generator in a different angular position with respect to the bicycle wheel tire for driving under a different ratio;

Fig. 5 is a fragmentary view with a part in section showing another construction of the generator driving pulley cooperating with the bicycle wheel tire;

Fig. 6 is a fragmentary view of the generator driving pulley of Fig. 5 and of the cooperating bicycle wheel tire in another respective position;

Fig. 7 is a fragmentary separate plan view of the flexible generator support on line 7—7 of Fig. 3 but with the parts in a position intermediate the positions of Figs. 3 and 4.

The generator 1 which may be of any approved construction and is intended to feed through a cable 17 a head light 18 arranged on the bicycle frame, is journalled by means of a pivot stud 14 on a support member 2 adapted to be mounted by the hereinafter described means on one arm of the fork 4 carrying the cooperating bicycle wheel 5. A spring 15 reacting on the support 2 and operative on the generator 1 or the pivot stud 14 thereof, urges said generator 1 towards the wheel 5 with the friction pulley 6 fast on the end of the driving shaft 19 thereof forced into frictional driving engagement with the wheel tire 20.

A latch 21 carried by a spring 22 having one end fast on the generator and adapted to cooperate with an indentation 23 of the support 2, enables the operator to lock the generator 1 in a position on said support 2 in which the generator pulley 6 is held spaced from the wheel tire 20 at the time the generator 1 is desired to be held inoperative.

The friction pulley 6 of the generator 1 has rims having different diameters as illustrated in Figs. 3 and 4 where a smaller rim 7 and a larger rim 7' are provided, said rim 7 being located at the outer end of the pulley 6 whilst the larger rim 7' is provided on the pulley end adjacent to the body of the generator 1.

The support 2 for the generator is mounted on the bicycle fork 4 by means of a carrier providing for a deviation about an axis parallel with the middle plane of the bicycle wheel said plane being referenced in Figures 3 and 4 by the line x—x where it intersects the sheet plane being perpendicular to it.

As illustrated the support 2 is fastened, at a point lying under the pivot stud 14, on a carrier rod 8 extending longitudinally of the vehicle; said rod 8 consists of a number of flexible strips arranged in close contact with each other and is shaped to embrace an arm of the bicycle fork 4, it being clamped thereon by means of a strap 3 and bolts 24.

An arm 9 extends upwardly from the strap 3 and provides a transverse lug 10 having a slot 11 which expands in a recess 16 at each of its ends (Fig. 7).

An operating handle 12 having a top manipulating knob 13 extends through said slot 11 and has its bottom end fast on the support 2, said handle 12 being contrived in a manner that its inherent elasticity urges it against the edge of the slot 11 in which said recesses 16 are provided.

By shifting the handle 12 in a transverse direction with respect to the bicycle, that is, along the slot 11 and releasing it to engage either of recesses 16, this manipulation being permitted by the resiliency of the rod 8 which is able to be easily twisted about its longitudinal axis, the support 2 with the pivot 14 carrying the generator 1 may be located in either of two angular positions about the axis of rod 8 as shown in Figs. 3 and 4.

By said manipulation and as an effect of the different angular positions thus taken up by the support 2, the generator pivot stud 14 is brought to different distances with respect to the longitudinal middle plane $x$—$x$ of the wheel 5; consequently the generator 1 which is permanently urged towards the wheel 5 by the spring 15 operative thereon and reacting on the support 2, in a position in which its driving pulley 6 contacts with the wheel tire 20, takes a more or less inclined position in each of which either of the pulley rims 7 or 7′ having different radii frictionally engages the wheel tire 20 for the driving of the generator shaft 19 by the bicycle wheel when the bicycle is running.

By the above described arrangement the operator may obtain by the manipulation of the handle 12 either of two different ratios of drive transmission between the bicycle wheel 5 and the generator shaft 19, as existing between the respective radii of said rims 7 or 7′ and the radius of the wheel tire 20 at the point thereof where said rim 7 or 7′ contacts therewith.

The rims 7 and 7′ are built up in a manner proper to secure their frictional adherence with the wheel tire 20. In the illustrated embodiment the rim 7 has a comparatively large longitudinal extent and it is knurled for improving its frictional engagement with the tire 20 while the rim 7′ is of comparatively small size and has a rounded cross section; the pulley region intermediate said rims has a comparatively reduced diameter to prevent said intermediate region from contacting with the wheel tire 20.

The pulley 6 having the rims 7 and 7′ may be made of metal with said rims directly formed thereon, or the drive rims may be separate from the pulley 6 and fixed thereon; the rims may then be made of a metal different from the metal of said pulley 6 or they or either of them may be made of rubber. More particularly the rim 7′ may consist of a rubber ring fixed in a groove of the pulley 6 as illustrated in Figs. 5 and 6 in the event said pulley rim 7′ is arranged to frictionally engage the side edge of the wheel metal rim 25.

This invention is not restricted to the described embodiment and includes all equivalents lying within the spirit of appended claims.

In a modified embodiment lying within claims the adjustable generator support 2 is fast on a carrier mounted to oscillate on a pivot secured to a strap fast on the bicycle fork arm 4, said pivot extending longitudinally in the direction the flexible arm 8 extends, in the illustrated embodiment, while the support 2 has a longitudinal seat for its oscillatory mounting on said pivot, said seat extending in a direction substantially parallel with the axis of the generator pivot stud 14.

Further, any convenient remote operating means may be used to actuate the oscillatory carrier for the support 2 instead of the illustrated handle 12.

What I claim as my invention and desire to secure by United States Letters Patent is:

1. In electric lighting means for vehicles including a generator adapted to be driven by a vehicle wheel, a generator driving pulley having rims with different radii for frictional engagement with said wheel, a carrier mounted on the vehicle frame adjacent to the vehicle wheel, a support carried by said carrier and having said generator pivotally mounted thereon, means cooperating with said support and generator to urge said generator in position with said drive pulley thereof in engagement with said vehicle wheel, said carrier being movable to locate said support and generator at different positions with respect to said vehicle wheel with a respective one of said generator drive pulley rims in engagement with said vehicle wheel, means for manipulating said carrier and means for releasably locking said support on said carrier.

2. In electric lighting means for vehicles including a generator adapted to be driven by a vehicle wheel, a generator driving pulley having rims with different radii for frictional engagement with said wheel, a carrier mounted on the vehicle frame adjacent to the vehicle wheel, a support carried by said carrier and having said generator mounted to oscillate thereon around an axis, means cooperating with said support and generator to urge said generator in position with said drive pulley thereof in engagement with said vehicle wheel, said carrier carrying said support for oscillation around an axis substantially parallel with said axis of oscillation of said generator thereon to locate said generator at different positions with respect to said vehicle wheel with a respective one of said generator pulley rims in engagement with said vehicle wheel, means for manipulating said carrier and means for releasably locking said support on said carrier.

3. In electric lighting means for vehicles including a generator adapted to be driven by a vehicle wheel, a generator driving pulley having rims with different radii for frictional engagement with said wheel, a carrier mounted on the vehicle frame adjacent to the vehicle wheel, a support carried by said carrier and having said generator pivotally mounted thereon, means cooperating with said support and generator to urge said generator in position with said drive pulley thereof in engagement with said vehicle wheel, said carrier being twistable to locate said support at different distances from said vehicle wheel with said generator and drive pulley thereof in different positions for engagement of a respective one of said pulley rims with said vehicle wheel, means for manipulating said carrier, and means for releasably locking said support on said carrier.

4. In electric lighting means for vehicles including a generator adapted to be driven by a vehicle wheel, a generator driving pulley having rims with different radii for frictional engagement with said wheel, a rod mounted on the vehicle frame adjacent to the vehicle wheel, a support carried by said rod and having said generator pivotally mounted thereon, means cooperating with said support and generator to urge said generator in position with said drive pulley thereof in engagement with said vehicle wheel, said rod consisting of a number of coextensive flexible strips and being twistable to position said support at different distances from said vehicle wheel with said generator and drive pulley thereof in different positions for engagement of any desired one of said pulley rims with said vehicle wheel, means for manipulating said rod, and means for releasably locking said rod and support in selected positions.

5. In an electric lighting means for vehicles including a generator adapted to be driven by a vehicle wheel, a generator driving pulley having rims with different radii for frictional engagement with said wheel, one of said rims being of rubber, a carrier mounted on the vehicle frame adjacent to the vehicle wheel, a support carried by said carrier and having said generator pivotally mounted thereon, means cooperating with said support and generator to urge said generator in position with said drive pulley thereof in engagement with said vehicle wheel, said carrier being movable to locate said support and generator at different positions with respect to said vehicle wheel with any desired one of said generator drive pulley rims in engagement with said vehicle wheel, means for manipulating said carrier, and means for releasably locking said support in said carrier.

6. In electric lighting means for vehicles including a generator adapted to be driven by a vehicle wheel, a generator driving pulley having rims with different radii for frictional engagement with said wheel, a carrier mounted on the vehicle frame adjacent to the vehicle wheel, a support carried by said carrier and having said generator pivotally mounted thereon, means cooperating with said support and generator to urge said generator in position with said drive pulley thereof in engagement with said vehicle wheel, said carrier being movable to locate said support and generator at different positions with respect to said vehicle wheel with any desired one of said generator drive pulley rims in engagement with said vehicle wheel, a manipulating handle fast with said carrier, and a lug fast on the vehicle frame and having a slot through which said handle extends said slot providing recesses for engagement by said handle to releasably lock said handle, carrier and support in selected positions.

PIETRO VIANZONE.